United States Patent [19]

DeBenedetti

[11] Patent Number: 4,602,850

[45] Date of Patent: Jul. 29, 1986

[54] LIGHT VALVE DISPLAY HAVING INTEGRATED DRIVING CIRCUITS AND SHIELD ELECTRODE

[75] Inventor: Edward DeBenedetti, San Jose, Calif.

[73] Assignee: Vidium, Inc., Sunnyvale, Calif.

[21] Appl. No.: 587,689

[22] Filed: Mar. 8, 1984

[51] Int. Cl.⁴ .............................................. G02F 1/133
[52] U.S. Cl. ...................................... 350/333; 350/332; 350/334; 350/336
[58] Field of Search ................. 350/332, 333, 334, 336

[56] References Cited

U.S. PATENT DOCUMENTS

| | | | |
|---|---|---|---|
| 3,503,673 | 3/1970 | Heilmeier . | |
| 3,786,486 | 1/1974 | Torresi . | |
| 3,820,875 | 6/1974 | Bohmer | 350/336 |
| 3,824,002 | 6/1974 | Beard . | |
| 3,914,019 | 10/1975 | Byatt | 350/336 |
| 3,991,416 | 11/1976 | Byles | 350/332 |
| 4,024,626 | 5/1977 | Leupp et al. | 29/571 |
| 4,137,524 | 6/1979 | Chen et al. | 350/336 |
| 4,191,452 | 3/1980 | Grinberg et al. | 350/334 |
| 4,191,454 | 3/1980 | Braatz et al. | 350/334 |
| 4,227,201 | 10/1980 | Grinberg et al. | 350/334 |
| 4,239,347 | 12/1980 | Braatz et al. | 350/336 |
| 4,239,348 | 12/1980 | Grinberg et al. | 350/334 |
| 4,245,168 | 1/1981 | Waldron | 350/332 |
| 4,319,239 | 3/1982 | Stephens | 350/336 |
| 4,385,806 | 5/1983 | Fergason | 350/347 R |
| 4,389,096 | 6/1983 | Hori et al. | 350/339 R |
| 4,403,217 | 9/1983 | Becker et al. | 340/718 |
| 4,409,724 | 10/1983 | Tasch et al. | 29/571 |
| 4,429,955 | 2/1984 | Portmann | 350/336 |
| 4,449,125 | 5/1985 | Clerc et al. | 350/336 |
| 4,542,960 | 9/1985 | Yang | 350/336 |

FOREIGN PATENT DOCUMENTS

| | | | |
|---|---|---|---|
| 0961145 | 1/1975 | Canada | 340/784 |
| 0058593 | 8/1982 | European Pat. Off. . | |
| 2499741 | 8/1982 | France . | |
| 0133726 | 5/1980 | Japan | 350/336 |
| 0107215 | 8/1981 | Japan | 350/334 |

OTHER PUBLICATIONS

Gladstone et al., "Liquid Crystal Display Device Configuration", IBM Technical Disclosure Bulletin, vol. 15, No. 2, Jul. 1972, pp. 437 & 438.

*Primary Examiner*—John K. Corbin
*Assistant Examiner*—David Lewis
*Attorney, Agent, or Firm*—Majestic, Gallagher, Parsons & Siebert

[57] ABSTRACT

A display device and operational method wherein driving and controlling electronic circuits are provided along with a liquid crystal layer as part of a unitary structure. An array of independent pixel reflective electrodes are provided behind the liquid crystal layer and are individually driven by the electronic circuits provided as part of the device. A light and electrostatic shield is provided between the electrode array and the integrated electronic circuit. The shield can also be utilized as a third electrode to bias the liquid crystal for faster response when voltages are applied to the individual electrodes.

7 Claims, 5 Drawing Figures

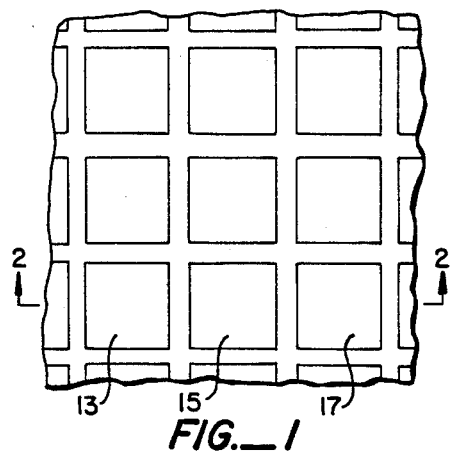
FIG.__1
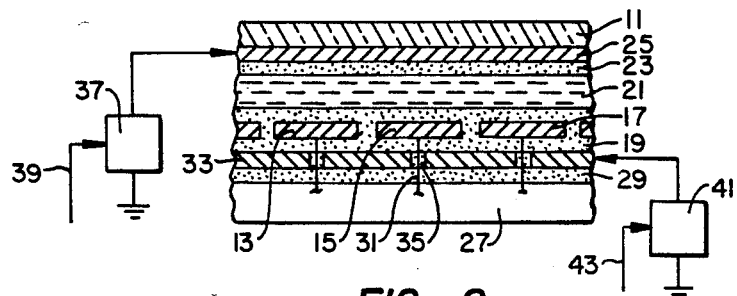
FIG.__2.
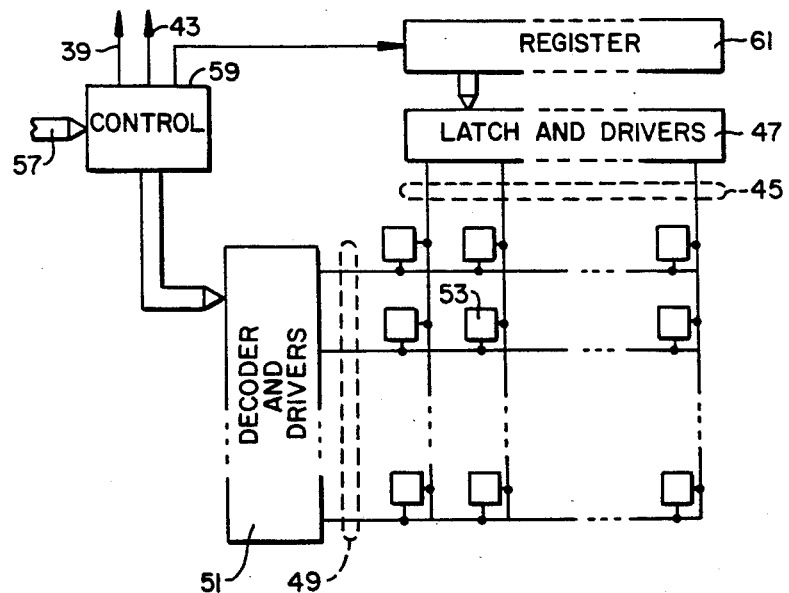
FIG.__3.

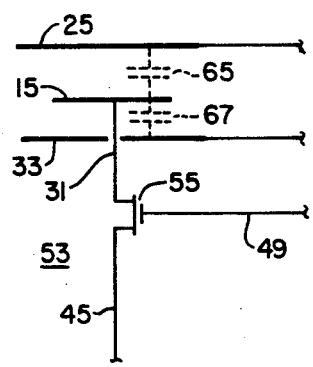
FIG._4.
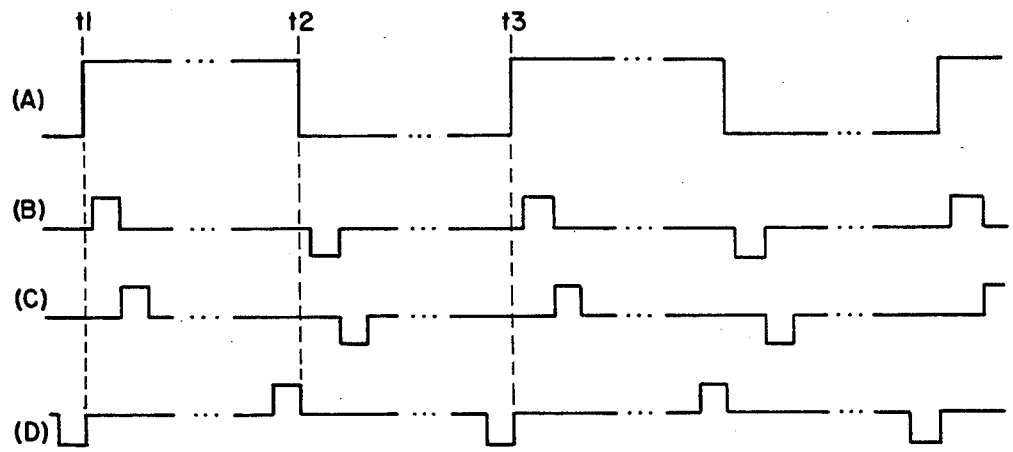
FIG._5.

LIGHT VALVE DISPLAY HAVING INTEGRATED DRIVING CIRCUITS AND SHIELD ELECTRODE

BACKGROUND OF THE INVENTION

This invention relates generally to two-dimensional light valve display devices, and more specifically to such devices of the type using a liquid crystal material or the like.

A great deal of emphasis has been placed in recent years on liquid crystal flat panel display devices. Recognized advantages of such devices are low electrical power consumption and small size. Liquid crystal displays are widely used in watches and other small battery driven consumer products. In recent years, larger liquid crystal display devices have been developed and utilized in portable computers and the like. Such general display devices individually control separate pixels or dots across the liquid crystal layer in order to form virtually any type of alpha-numeric character set or general graphics images. The size of each individually controlled pixel or dot determines the smallest resolution element size of a displayed image.

The liquid crystal material most commonly utilized for such displays is normally in an optically neutral state in the absence of any significant electrostatic field applied through the liquid crystal layer. When an electrostatic field above some threshold is applied therethrough, the material rotates the polarization of light incident upon it and also changes its index of refraction, so long as the field remains. When the electrostatic field drops below the threshold, the material returns to its neutral state. Thus, the application of an electrostatic field above the threshold in a particular pattern across the two-dimensional display will cause the portions of liquid crystal so exposed to change its visible optical characteristics with respect to other portions, thus controllably displaying a pattern. If the effect of the liquid crystal material on light polarization is being utilized, the pattern is viewed through an optical system that includes polarizers. If the change of index of refraction characteristic is being utilized, it is viewed through a Schlieren optical system.

Such devices generally apply the electrostatic field through the liquid crystal layer by electrode surfaces on either side thereof. A voltage is not necessarily applied to these electrodes for the entire duration that the display is desired, but rather voltage thereacross is periodically applied, an electrostatic field being maintained between voltage pulses by inherent capacitance of the device. If subsequent display refreshing pulses are not applied, this capacitance will discharge in a short period of time and cause the liquid crystal to return to its neutral state. Such liquid crystal material also has the characteristic of responding unfavorably to a direct current electrostatic field, so the refreshing pulses are commonly made to have an alternating polarity which maintains the average electrostatic field at zero.

Another type of liquid crystal, which is not as commonly used, selectively changes the relative phase of light incident upon it and has a "memory"; that is, the optical change of material in response to a single application of an electrostatic field through it stays that way indefinitely. In order to make the material clear again, therefore, an erasing electrostatic field must be applied. This type of material is characterized by scattering incident light in regions where the field is applied, when it is used with an adjacent glass layer that is appropriately treated.

It is a primary object of the present invention to provide a light valve device having a liquid crystal or similar material that changes optical characteristics in response to electrostatic fields, and driving and controlling circuits provided integrally therewith.

It is another object of the present invention to provide such a device that is economical to manufacture, simple to incorporate into electronic systems and which is capable of changing its image at a high rate of speed.

It is a further object of the present invention to provide a liquid crystal display device of small size but which is capable of providing a high resolution display that may be magnified before viewing by projection optics or otherwise.

SUMMARY OF THE INVENTION

These and additional objects are provided by the various aspects of the present invention, wherein, briefly, according to one aspect, individual, reflective pixel electrodes are provided in an array behind a liquid crystal layer with each such electrode being operably connected to an attached integrated circuit which contains circuits to drive and control the electrodes and the display, a light and electrostatic shield being provided between the integrated circuit and the pixel electrodes to isolate the two. By providing controlling and driving electronics as part of the display device itself, the number of lines which must be connected from a host electronic system to a display device is minimized. It has been found, however, that the making of a very small integrated device structure provides undesired light and electrostatic coupling between the circuits and the liquid crystal display electrodes. Accordingly, the multipurpose shield between them allows a much more compact structure to be realized.

According to another aspect of the present invention, the shield can also be utilized as an electrode in controlling the liquid crystal display material. According to one technique, the shield is used as one electrode in providing a biasing electrostatic field through the liquid crystal layer so that a smaller incremental electrostatic field need be provided by the individual pixel electrodes when it is desired to change the state of the liquid crystal material at selected pixel locations. This results in increasing the speed of response of the liquid crystal material. In addition, the shield can be utilized to erase the entire display, or a large portion of it, when the liquid crystal material is of the type that has a memory and requires an erasing electrostatic field to clear it.

Additional objects, features and advantages of the various aspects of the present invention are included in the following description of a preferred embodiment of the invention, which description should be taken in conjunction with the accompanying drawings.

BRIEF DESCRIPTION OF THE DRAWINGS

FIG. 1 shows an enlarged view of a portion of a display device from its front;

FIG. 2 is a cross-sectional view of the display device of FIG. 1 taken at Section 2—2 thereof;

FIG. 3 illustrates in block diagram form an electronic circuit for driving the display of FIGS. 1 and 2;

FIG. 4 shows in electronic schematic diagram form a single driver used in the system of FIG. 3; and FIG. 5 illustrates some example waveforms of the driving circuit of FIGS. 3 and 4.

DESCRIPTION OF A PREFERRED EMBODIMENT

Referring initially to FIGS. 1 and 2, the physical structure of an integrated display and electronic driving circuit according to the present invention will be explained. A two-dimensional array of light reflective, electrically conductive electrodes positioned in two dimensions along an internal surface of the device is visible through a front glass panel 11. A row of these electrodes, denoted by the referenced numerals 13, 15 and 17, will be discussed further as exemplary. The shape and extent of each electrode defines the pixel element size that is independently controllable by that electrode. A large display can have an array with an extent of thousands of electrodes in either direction. The number of individual pixels in a display is, of course, adapted to the particular use intended for the display. Each pixel electrode is preferably highly reflective to incident light.

Each of the electrodes, as exemplified by electrodes 13, 15 and 17, are held spaced apart a small distance by a substantially optically transparent electrically insulating material 19, such as silicon dioxide ($SiO_2$). The layer 19 completely surrounds the electrodes and provides a liquid impervious layer of electrical insulation between them and a layer 21 of liquid crystal material. The liquid crystal layer 21 is bounded on an opposite side by a layer 23 of the same type of material as a layer 19, preferably silicon dioxide. The layer 23 keeps the liquid crystal material from directly contacting a transparent electrically conductive layer 25, such as tin indium oxide (TIO). When a voltage difference exists at the forward conductive layer 25 and one or more of the pixel electrodes in order to develop an electrostatic field through that portion of the liquid crystal layer 21 over those pixel electrodes, the liquid crystal material 21 will change from a normal state to its optically detectable altered state. The particular mechanisms that may be utilized in making this change are discussed previously, and depend upon the viewing optical system and particular liquid crystal that is employed. A suitable material for the liquid crystal layer 21, of the type that returns to its normal state in absence of an electrostatic field existing through it, is a mixture of the following proportions of available materials:

| | |
|---|---|
| 4-Cyano-4'-(2-methyl) butoxybiphenyl | 1% |
| t-4-propyl-(4'-cyanophenyl) cyclohexane | 20% |
| t-4-pentyl-(4'-cyanophenyl) cyclohexane | 30% |
| t-4-heptyl-(4'-cyanophenyl) cyclohexane | 9% |
| t-4-pentyl-(4'-cyanbiphenyl-4) cyclohexane | 12% |
| 4-cyanophenyl-4'-propylcyclohexanoate | 14% |
| 4-cyanophenyl-4'-pentylcyclohexanoate | 14% |

The light valve structure of FIGS. 1 and 2 includes a semiconductor large scale integrated circuit 27 (I.C.) which contains the circuits to be described hereinafter for driving each of the pixel array electrodes to selectively control the display. The I.C. 27 is not shown in detail since it can be of the usual LSI construction with the I.C. substrate forming a rearmost surface, shown exposed in FIG. 2, of the composite structure. A layer 29 of insulating material, such as silicon dioxide 29, covers the I.C. 27. A layer of conductors, such as aluminum or poly-silicon, near the top of the I.C. 27 (not shown) provides circuit attachment points for the single conductors which are extended to each of the pixel electrodes to independently control voltage, a conductor 31 being connected between the I.C. and the array electrode 15 being identified for the purpose of illustration.

It has been found that such a compact, composite structure can result in some problems arising due to coupling between the circuits on the I.C. 27, on the one hand, and the liquid crystal display portion, on the other hand. It has been found that this undesired coupling includes both light emanating from the front portion of the structure to the I.C. 27, which will affect the operation of the circuits on the I.C. 27, and also electrostatic fields generated by the I.C. 27 that affect operation of the liquid crystal 21.

Both of these types of undesirable coupling are substantially minimized, if not eliminated, by providing a shield 33 between the pixel array electrodes and the I.C. 27. This shield is characterized by being light tight, and preferably highly reflective on its front surface adjacent the array electrodes, as well as being electrically conductive. A small aperture is provided in the shield (or rear conductive surface) 33 behind each pixel electrode. For example, a small hole 35 is provided behind the pixel electrode 15 through which its conductor 31 passes, the area of the aperture 35 being larger than the cross-sectional area of the conductor 31 and is the filled with with an insulating material such as silicon dioxide in order to provide electrical insulation between the conductor and the conductive layer 33. The layer 33 provides an adequate electrostatic shield since the area of the non-conductive apertures therein is very small. Further, since each aperture is located beneath one of the pixel array electrodes, and preferably as close to its center as possible, substantially no light passes through the opaque layer 33, even though the insulating material filling its apertures around the electrode conductor is substantially transparent. A preferred material for the rear conductive layer 33 is aluminum.

In a generalized case, the potential of the forward conductive layer 25 is maintained by a circuit 37 in response to a control signal 39. In most cases, the circuit 37 will not exist but rather the layer 25 will be connected to some fixed potential, such as ground potential. But a possible variation of this is explained hereinafter, wherein the circuit 37 is constructed as part of the I.C. 27.

Similarly, the rear conductive plane (shield) 33 may simply be connected to a fixed potential, such as ground, but a variation thereof involving another aspect of the present invention (discussed below) applies a varying voltage from a circuit 41 that receives a control signal in a line 43. The circuit 41, when utilized, is also constructed as part of the I.C. 27.

Referring to FIG. 3, a block diagram representation of the circuits formed on the I.C. 27 is given. A plurality of signal lines 45 have a voltage individually controlled in each by a latching and driving circuit 47. Similarly, a plurality of address lines 49 are individually controlled by a decoding and driving circuit 51. Each pixel electrode, such as the electrode 15, is driven between zero voltage and pre-determined voltage states by a switching circuit, such as a circuit 53, that exists at an intersection of one of the signal lines 45 and one of the address lines 49. There is a unique switching circuit for each of the electrodes, and it may include a bipolar transistor, field effect transistor, or transfer gate. An example of such a circuit is shown in FIG. 4 which simply includes, as an example, a field effect transistor 55 having a source connected to one of the signal lines 45 and its gate connected to one of the address lines 49. A drain of the transistor 55 is connected to the line 31 which, in the example of FIG. 4, is connected directly to the pixel electrode 15. There is a separate transistor of this type connected to each of the pixel electrodes of the two-dimensional array, all such transistors being formed as part of the I.C. 27.

In a typical operation of the circuit of FIG. 3, signals are received on a bus 57 from a host computer or other device which indicate those pixels for which their electrodes are to be energized for developing a display. A control circuit 59 receives these external signals and passes them to the circuits 51 for decoding from that signal which of the address lines 49 is to be energized. Similarly, the circuits 59 pass a signal to a serial register 61 to identify those of the signal lines 45 which are to be energized at any moment in time.

The usual operation is for the circuits 51 to apply a voltage at any given instant to only one of the address lines 49, such as a five volt drain voltage, and then apply a voltage simultaneously to all of the signal lines 45 whose pixel electrode attached to that single signal line 49 is to be energized. The voltages so applied to the signal lines 45 need to be in excess of the threshold voltage of the transistor 55 utilized. The result is that each such transistor whose gate is given sufficient voltage to turn it on, and which is along the address line 49 that is energized, will pass the voltage of the line 49 to its associated pixel electrode, the electrode 15 being illustrated in FIG. 4. Once the display of one row of pixels is thus made, that energized address line 49 is de-energized, and a next in sequence address line is energized with new signal being received by the register 61 and presented through the latch circuit 47 to turn on an independently controllable set of pixels in that row. The process thus repeats itself in accordance with the display information received on the bus 57 in order to maintain an average DC voltage across the liquid crystal at substantially zero, alternate scannings of the address lines 49 having alternate polarity voltages.

What has been described is a system for driving the most common type of liquid crystal material, namely the type that requires an electrostatic field above some threshold before the visible optical characteristics of the material is changed from its normal substantially transparent state. When the electrostatic field is removed, the material returns to its normal transparent state. The system of FIG. 3, by repetitively scanning all of the pixel electrodes periodically, causes the material to stay in its opaque state even though a voltage is not applied to the electrode at all times. This is because of an inherent capacitance 65, as shown in FIG. 4, that exists between the pixel electrode 15 and the forward conductive layer 25. That capacitance 65 is charged periodically, and then again recharged before enough voltage is leaked to drop below the threshold voltage for the liquid crystal material. Of course, this repetitive scanning occurs only for those pixels where it is desired to keep the liquid crystal material in its darkened state. Once it is desired that the pixel return to its substantially transparent state, voltage is omitted from the signal line 45 during the next scanning of that pixel, resulting in the transistor 55 remaining off and no voltage being applied to the pixel electrode 15.

According to another aspect of the present invention, it has been discovered that the rear conductive plane (shield) 33 can serve another function in addition to the light and electrostatic shielding discussed above. Rather than holding the shield 33 at a constant voltage, such as at ground potential, it can be utilized to bias the liquid crystal in order to bring about quicker response in turning desired pixels from the transparent to the darkened state, when desired to do so. FIG. 5(A) shows a periodically varying voltage that can be applied by the circuit 41 under the control of a timing signal in the line 43 to the rear conductive surface 33. Its period between the times t1 and t3 is made sufficient to enable scanning all of the address lines 49 twice, and in many applications will have a frequency of about 60 Hz. FIG. 5(B) shows an example of a voltage waveform applied to a first of the address lines 49, FIG. 5(C) the next in order of the address lines 49 that are scanned, and FIG. 5(D) a voltage waveform of the last of the address lines 49 which are repetitively scanned. The voltage of the FIG. 5(A) signal applied to the conductive layer 33 is somewhat less than that of the threshold of the liquid crystal material layer 21. This assumes that the forward conductive layer 25 is held at ground potential. Thus, the voltage between the conductive planes 25 and 33 is insufficient to cause enough of an electrostatic field to change the liquid crystal from its transparent to its dark state. But by applying such an electrostatic field near that threshold, the pixels which are desired to be darkened can be done so faster by application of the voltage through the individual driving circuits such as that as shown in FIG. 4. It will be noted that a capacitance 67 also exists between the pixel electrode 15 and the rear conductive layer 33 which provides coupling between the two. Since the pixel electrode 15 is electrically floating when its driving transistor 55 is turned off, it will take on a voltage approaching that of the layer 33 through this capacitive coupling, plus or minus any charge previously put on the electrode.

Because the liquid crystal material being used as an example must have an electrostatic field of alternating polarity applied across it, the voltage of FIG. 5(A) applied to the rear conductive plane 33 is alternating with its half cycles between the times t1 and t2, and between the times t2 and t3 being substantially equal. Each of these one-half cycles is made long enough for the circuits 51 to scan all of the address lines 49, the signals applied to a few of the address lines 49 being illustrated in FIGS. 5(B), 5(C) and 5(D) for three separate lines, as exemplary. These driving signals and the address lines 49 must, therefore, be of the same polarity as is the rear conductive plane voltage of FIG. 5(A) at that instant. Thus, as can be seen from FIGS. 5(B), 5(C) and 5(D), the voltages applied to each of the address lines 49 in sequence are of alternate polarity.

As an alternative to applying the voltage of FIG. 5(A) to the conductive plane 33 and holding the front conductive plane 25 at ground potential, a square wave can also be applied to the front conductive layer 25 through the circuit 37 in response to timing signals in the conductor 39. Such a square wave would necessarily have to be 180° out of phase with that of FIG. 5(A) that is applied the rear conductive layer 33.

If another type of available liquid crystal material is utilized that has a "memory", the conductive surface 33 can serve a different function. An example of an appropriate liquid crystal material having a memory characteristic is the mixture of seven materials previously set forth, with a proportion of 86%, and the remaining 14% being cholesterol noanoate, or equivalent, mixed therewith. Since the phase change of this liquid crystal material will remain indefinitely after an electrostatic field has been applied and removed, there is no need to drive the liquid crystal layer with voltages of alternating potential. It is only necessary to return to a pixel that has been changed when it is desired to drive it back to its original state. This is currently done on a pixel by pixel basis. However, this reversing field can be applied by the circuit 41 of FIG. 2 through the rear conductive surface 33 of the display device of the present invention to reverse the liquid crystal in all of the pixels at one time.

Although the various aspects of the present invention have been described with respect to a preferred embodiment thereof, it will be understood that the invention is entitled to protection in the full scope of the appended claims.

It is claimed:

1. In a light valve display device of a type having a layer of liquid crystal material contained therein behind a front optically transparent, electrically conductive layer and a driving electronic integrated circuit mounted behind the liquid crystal layer, the improvement comprising:

a two-dimensional array of a plurality of light reflective electrodes positioned in a surface behind said liquid crystal layer and viewable through the liquid crystal layer, each of said electrodes being electrically insulated from adjacent electrodes, whereby an appropriate electrical potential between said front conductive layer and one of said electrodes causes a visual change of the liquid crystal material in front of said one electrode, the individual electrodes having the size and shape of image pixels, an electrically conductive, light opaque rear protective layer positioned between said array surface and said integrated circuit, said rear layer being connectable to an electrical potential independently of said array electrodes and front conductive layer, a plurality of conductors penetrating said rear protective layer and electrically insulated therefrom, a separate one of the plurality of conductors being positioned behind one of the array of electrodes and operably connecting this one electrode to the integrated circuit in a manner that the electrical potential of each electrode is independently controllable, and wherein said driving electronic circuit includes means electrically connected to said front conductive layer and said rear protective layer for independently controlling the voltages of said layers.

2. The improved display device according to claim 1 wherein said array of reflective electrodes is surrounded by a substantially optically transparent, electrically insulative material in a manner to provide a barrier between each of the electrodes of the array and the liquid crystal material layer.

3. In a light valve display device of a type having a front optically transparent electrically conductive layer, a layer of liquid crystal material therebehind that is characterized by making a desired change between two optical conditions when a level of voltage across the layer changes between two levels, and a driving electronic integrated circuit mounted behind the liquid crystal layer, the improvement comprising:

a two-dimensional array of a plurality of light reflective electrodes positioned in a surface between said integrated circuit and said liquid crystal layer, each of said electrodes being electrically insulated from adjacent of said electrodes, whereby control of the voltage between said front conductive layer and one of said electrodes between said two levels causes said desired change of the liquid crystal material in front of said one electrode between said two optical conditions, an electrically conductive and light opaque rear protective layer positioned between said array surface and said integrated circuit, said rear layer being connectable to an electrical potential independently of said array electrodes and front conductive layer, a plurality of conductors penetrating said rear protective layer and electrically insulated therefrom, each of the plurality of conductors being positioned behind one of the array of electrodes and operably connecting this one electrode to the integrated circuit, and wherein said driving electronic circuit includes means electrically connected to said front conductive layer and said rear protective layer for independently controlling the voltages of said layers.

4. The improved display device according to claim 3 which additionally comprises means included as part of said integrated circuit for alternately driving said rear layer between two predetermined voltage levels that are positive and negative with respect to a reference voltage, whereby the liquid crystal layer is biased.

5. The improved display device according to claim 4 which additionally comprises means included as part of said integrated circuit for applying to selected of said array of electrodes a voltage having the same polarity with respect to said reference as the biasing voltage applied to said rear layer, whereby the voltage of the electrode array combines with the bias voltage of the rear layer to control the optical properties of the liquid crystal material in front of said selected of the array of electrodes.

6. The improved display device according to claim 4 which additionally comprises means included as part of said integrated circuit for alternately driving said front layer between two predetermined voltage levels that are positive and negative with respect to said reference voltage in synchronism with the alternating voltage of said rear layer but with a polarity that is opposite thereto.

7. The improved display device according to claim 3 wherein said integrated circuit includes means responsive to external display control signals for individually controlling connection to each of said electrode array conductors between two voltages to result in the voltage across the liquid crystal layer changing between its said two levels at the location of said array electrode, thereby to individually control the state of the liquid crystal in front of each array electrode between its said two optical states.

* * * * *